(12) United States Patent
Okayama et al.

(10) Patent No.: US 12,448,782 B2
(45) Date of Patent: Oct. 21, 2025

(54) CONSTRUCTION MATERIAL, DECORATIVE MEMBER, AND METHOD FOR MANUFACTURING DECORATIVE MEMBER

(71) Applicant: KMEW Co., Ltd., Osaka (JP)

(72) Inventors: Nobuchika Okayama, Mie (JP); Hideo Aikawa, Nara (JP); Tomohisa Yamamoto, Nara (JP); Ryoko Maruyama, Osaka (JP); Arisa Miyake, Nara (JP)

(73) Assignee: KMEW CO., LTD., Osaka (JP)

( * ) Notice: Subject to any disclaimer, the term of this patent is extended or adjusted under 35 U.S.C. 154(b) by 106 days.

(21) Appl. No.: 17/796,265

(22) PCT Filed: Jan. 29, 2021

(86) PCT No.: PCT/JP2021/003339
§ 371 (c)(1),
(2) Date: Jul. 29, 2022

(87) PCT Pub. No.: WO2021/153767
PCT Pub. Date: Aug. 5, 2021

(65) Prior Publication Data
US 2023/0118123 A1 Apr. 20, 2023

(30) Foreign Application Priority Data

Jan. 31, 2020 (JP) .................. 2020-015273
Jan. 31, 2020 (JP) .................. 2020-015283

(51) Int. Cl.
*E04F 13/08* (2006.01)
*B05D 5/06* (2006.01)
(Continued)

(52) U.S. Cl.
CPC .......... *E04F 13/0873* (2013.01); *B05D 5/061* (2013.01); *B05D 7/53* (2013.01); *C09D 5/002* (2013.01); *C09D 7/42* (2018.01)

(58) Field of Classification Search
CPC ....... E04F 13/0873; C09D 7/42; C09D 5/002; B05D 5/061; B05D 7/53
(Continued)

(56) References Cited

U.S. PATENT DOCUMENTS

2013/0101793 A1* 4/2013 Saitou ................... B44C 1/1725
428/141
2015/0355489 A1* 12/2015 Takizawa ............. G02B 5/3083
359/489.07
2018/0126710 A1* 5/2018 Miyake ................... B32B 27/18

FOREIGN PATENT DOCUMENTS

CN 101563223 A 10/2009
CN 103108704 A 5/2013
(Continued)

OTHER PUBLICATIONS

JP 2018126949 Translation (Year: 2018).*
(Continued)

*Primary Examiner* — Travis M Figg
(74) *Attorney, Agent, or Firm* — HAUPTMAN HAM, LLP

(57) ABSTRACT

A construction material includes a base material. The base material includes a low-gloss region having a 60° gloss value of smaller than and a high-gloss region having a 60° gloss value of larger than or equal to 8. The 60° gloss value of the low-gloss region and the 60° gloss value of the high-gloss region are different from each other by 5 or greater.

12 Claims, 13 Drawing Sheets

(51) Int. Cl.
  *B05D 7/00*      (2006.01)
  *C09D 5/00*      (2006.01)
  *C09D 7/42*      (2018.01)
(58) Field of Classification Search
  USPC .......................................................... 428/141
  See application file for complete search history.

(56)                References Cited

FOREIGN PATENT DOCUMENTS

| CN | 105009041 A |   | 10/2015 |
|----|-------------|---|---------|
| JP | H10315364 A |   | 12/1998 |
| JP | 200490319 A |   | 3/2004  |
| JP | 2012246619 A | * | 12/2012 |
| JP | 2015108228 A | * | 6/2015  |
| JP | 2016002653 A |   | 1/2016  |
| JP | 2018048546 A |   | 3/2018  |
| JP | 2018051825 A | * | 4/2018  |
| JP | 2018126949 A | * | 8/2018  |
| JP | 2018164901 A | * | 10/2018 |
| JP | 201985308 A |   | 6/2019  |

OTHER PUBLICATIONS

JP 2015108228 A Machine Translation (Year: 2015).*
International Search Report in PCT/JP2021/003339, mailed Apr. 13, 2021, 4pp.
Office Action in CN application No. 202180011303.1, dated May 8, 2024, 23pp.

* cited by examiner

CONSTRUCTION MATERIAL, DECORATIVE MEMBER, AND METHOD FOR MANUFACTURING DECORATIVE MEMBER

RELATED APPLICATIONS

The present application is a National Phase of International Application Number PCT/JP2021/003339, filed on Jan. 29, 2021, which claims priority based on Japanese application Nos. 2020-015273 and 2020-015283, filed Jan. 31, 2020.

TECHNICAL FIELD

The present invention relates to a construction material, a decorative member, and a method for manufacturing the decorative member.

BACKGROUND ART

Patent Literature 1 discloses an inorganic decorative plate. The inorganic decorative plate includes: an inorganic decorative plate base material having a surface having large recesses and projections; a first clear layer provided on the entirety of the surface of inorganic decorative plate base material; and a second clear layer provided on only the projections of the inorganic decorative plate base material. The clear layers include respective prescribed amount of resin beads having prescribed particle sizes such that the luster and finish of projections are different from those of joint parts.

The inorganic decorative plate, however, may lead to the problem that expressible designs are limited.

An object of the present disclosure is to provide a construction material and a decorative member which are configured to widen the range of expressible designs, and a method for manufacturing the decorative member.

CITATION LIST

Patent Literature

Patent Literature 1: JP H10-315364 A

SUMMARY OF INVENTION

A construction material according to an aspect of the present invention includes a base material. The base material includes a low-gloss region having a 60° gloss value of smaller than 8 and a high-gloss region having a 60° gloss value of larger than or equal to 8. The 60° gloss value of the low-gloss region and the 60° gloss value of the high-gloss region are different from each other by 5 or greater.

A decorative member according to an aspect of the present invention includes the construction material and a coating film structure on the construction material. The coating film structure includes the low-gloss region and the high-gloss region.

A method for manufacturing a decorative member according to an aspect of the present invention includes: a step of preparing a base material; a step of forming an undercoat film by applying an undercoat material to the base material, the undercoat material including an aggregate, the undercoat film having a thickness smaller than an average particle size of the aggregate; and a step of forming a topcoat film by applying a topcoat material to the undercoat film, the topcoat film having a thickness less than a difference between the average particle size of the aggregate and the thickness of the undercoat film in a part to be formed into a low-gloss region, the topcoat film having a thickness greater than or equal to the difference between the average particle size of the aggregate and the thickness of the undercoat film in a part to be formed into a high-gloss region.

DESCRIPTION OF EMBODIMENTS

(1) First Embodiment

(1.1) Overview

Figure 1:
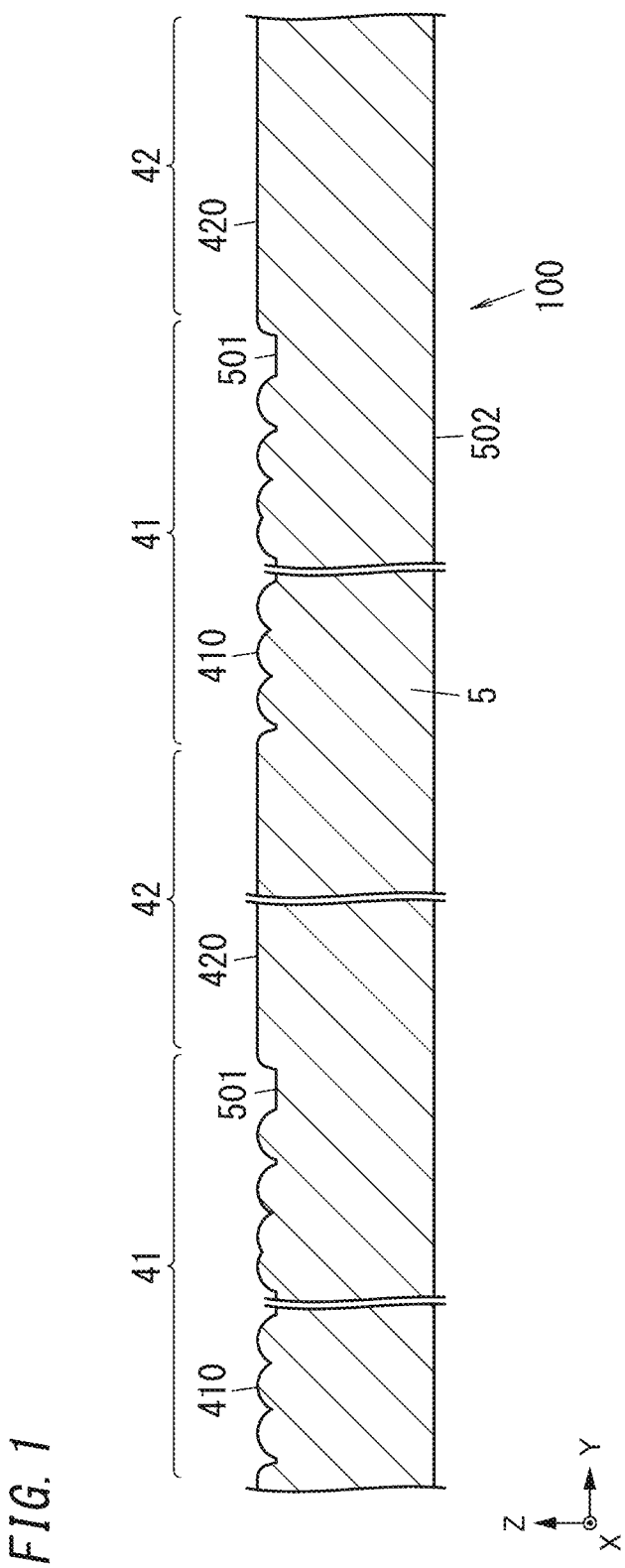
FIG. 1 is a schematic sectional view of a construction material according to a first embodiment.

First of all, the overview of a construction material 100 according to a first embodiment will be described. FIG. 1 shows the construction material 100 according to the present embodiment. The construction material 100 includes a base material 5. The base material 5 includes a low-gloss region 41 and a high-gloss region 42. The low-gloss region 41 has a 60° gloss value of smaller than 8. The high-gloss region 42 has a 60° gloss value of larger than or equal to 8. In addition, the difference between the 60° gloss value of the low-gloss region 41 and the 60° gloss value of the high-gloss region 42 is greater than or equal to 5. As described above, the construction material 100 includes two regions (the low-gloss region 41 and the high-gloss region 42) different from each other in gloss, thereby widening the range of expressible designs.

(1.2) Details

The construction material 100 according to the first embodiment will be described further in detail below with reference to FIG. 1 and other figures. For convenience of explanation of the positional relationship and the like, arrows representing an X-axis, a Y-axis, and a Z-axis constituting a three-dimensional orthogonal coordinate system are shown in the drawings, but these arrows are intangible. In the following description, an XY plan view means a view along a Z-axis direction (a thickness direction defined with respect to the construction material 100 and a decorative member 10). The X-axis, Y-axis, and Z-axis directions are mere examples and are not intended to limit directions while the construction material 100 and the decorative member 10 are manufactured and in use. Moreover, in the drawings described below, the configurations of the construction material 100 and the decorative member 10 are schematically represented, and dimensional relationships and the like of components in the drawings may differ from the actual one.

<Construction Material>

FIG. 1 shows the construction material 100 according to the present embodiment. The construction material 100 is used, for example, as an exterior material. Examples of the exterior material include external wall materials and roofing materials. The construction material 100 is a plate-like member. The construction material 100 has a substantially rectangular shape in the XY plan view.

The construction material 100 according to the present embodiment includes a base material 5. Examples of the base material 5 include, but are not particularly limited to, fiber reinforced cement siding, resin-based siding, and metal-based siding. Examples of the shape of the base material 5 include, but are not particularly limited to, a plate shape. In the present embodiment, the base material 5 has a plate shape. The base material 5 has a substantially rectangular shape in the XY plan view. The base material 5 has a first surface 501 and a second surface 502. The first surface 501 is a surface in the positive direction of the Z-axis. The second surface 502 is a surface on an opposite side of the first surface 501 and is in the negative direction of the Z-axis. Thus, the first surface 501 and the second surface 502 serve as front and back surfaces of the base material 5.

In the present embodiment, the construction material 100 has a surface including a low-gloss region 41 and a high-gloss region 42. More specifically, the first surface 501 of the base material 5 includes the low-gloss region 41 and the high-gloss region 42. The second surface 502 of the base material 5 is a flat surface.

The low-gloss region 41 is a region which is less glossy than the high-gloss region 42. Specifically, the low-gloss region 41 has a 60° gloss value of smaller than 8. This can make the exterior appearance of the low-gloss region 41 resemble, for example, wood, a brick, a stone, or a tile (low-gloss tile). The low-gloss tile is a tile having a 60° gloss value of smaller than 8. The 60° gloss value is defined by, for example, JIS Z8741:1997. The 60° gloss value is measurable with a publicly known glossmeter.

Figure 13:
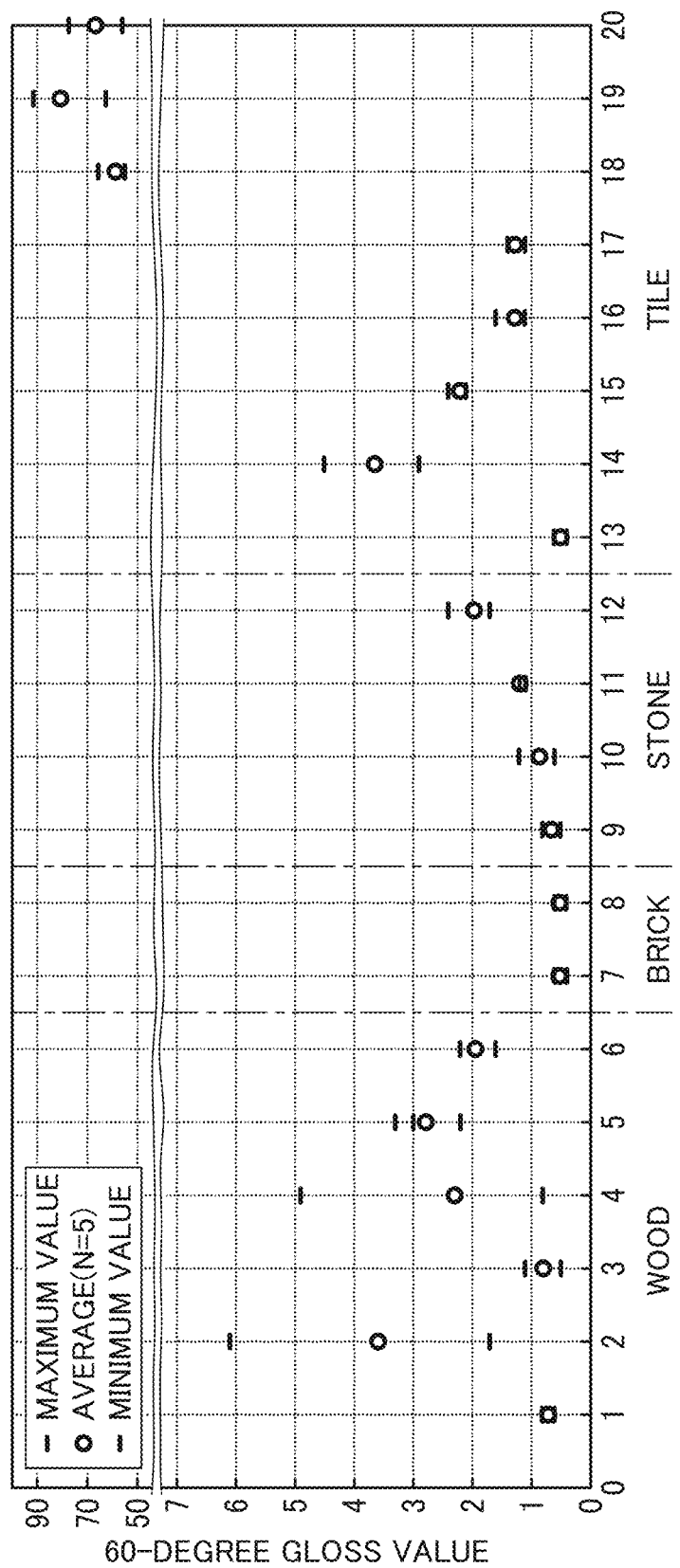
FIG. 13 is a graph of measurement results of 60° gloss values of wood, a brick, a stone, and a tile.

Here, FIG. 13 is a graph showing measurement results of 60° gloss values of actually existing wood (6 kinds), bricks (two types), stones (4 types), and tiles (8 types). In the graph shown in FIG. 13, the ordinate represents the 60° gloss values, and the abscissa represents sample numbers. The sample numbers and specific sample names are as shown in Table 1 below.

TABLE 1

| No. | |
|---|---|
| | Wood (Sample Name) |
| 1 | Burnt Cypress A |
| 2 | Burnt Cypress B |
| 3 | Dead Wood A |
| 4 | Dead Wood B |
| 5 | Teakwood |
| 6 | Ipe Wood |
| | Brick (Sample Name) |
| 7 | Fired Brick |
| 8 | Sun-Dried Brick |
| | Stone (Sample Name) |
| 9 | Pyroxene Andesite |
| 10 | Slate |
| 11 | Sandstone |
| 12 | Quartz Stone |
| | Tile (Sample Name) |
| 13 | Tile A Expressing Small-Section Feeling |
| 14 | Tile B Expressing Small-Section Feeling |
| 15 | Tile C Expressing Small-Section Feeling |
| 16 | Tile Expressing Large-Section Feeling |
| 17 | Tile with Texture |
| 18 | Glaze Tile A |
| 19 | Glaze Tile B |
| 20 | Glaze Tile C |

The lower limit value of the 60° gloss value of the low-gloss region 41 is, for example, 0 but is not particularly limited to this example. Note that glaze tiles A to C of No. 18 to 20 are high-gloss tiles. The high-gloss tiles are tiles having a 60° gloss value of greater than or equal to 8.

In the present embodiment, the low-gloss region 41 has a surface roughness Ra of greater than or equal to 1.5 µm. The surface roughness Ra being greater than or equal to 1.5 µm facilitates lowering the gloss of the low-gloss region 41. In the present specification, "surface roughness Ra" means arithmetic mean roughness defined by JIS B0601:2001. The surface roughness Ra is measurable with a publicly known surface roughness measuring device. The upper limit value of the surface roughness Ra of the low-gloss region 41 is, for example, 800 µm but is not particularly limited to this example.

The surface of the construction material 100 includes at least one or more low-gloss regions 41. The gloss, the surface roughness Ra, the size, and the shape of one low-gloss region 41 are not particularly limited. When the surface of the construction material 100 includes a plurality of low-gloss regions 41, these low-gloss regions 41 may be the same or different in terms of the gloss, the surface roughness Ra, the size, and/or the shape. At the surface of the construction material 100, an area occupied by the at least one or more low-gloss regions 41 is not particularly limited.

In contrast, the high-gloss region 42 is a region which is glossier than the low-gloss region 41. Specifically, the high-gloss region 42 has a 60° gloss value of larger than or equal to 8. This can make the exterior appearance of the high-gloss region 42 resemble, for example, a tile (high-gloss tile) (see FIG. 13 and the glaze tiles A to C of No. 18 to 20 in Table 1).

Preferably, the 60° gloss value of the high-gloss region 42 is larger than or equal to 70 and smaller than or equal to 150. The 60° gloss value of the high-gloss region 42 being larger than or equal to 70 can further highlight the difference in gloss between the low-gloss region 41 and the high-gloss region 42. The 60° gloss value of the high-gloss region 42 being smaller than or equal to 150 can suppress the construction material 100 from being high-gloss in whole.

Moreover, in the present embodiment, the difference between the 60° gloss value of the low-gloss region 41 and the 60° gloss value of the high-gloss region 42 is greater than or equal to 5. Highlighting the difference in gloss between the low-gloss region 41 and the high-gloss region 42 enables the expressible designs to be accentuated.

Preferably, the surface roughness Ra of the high-gloss region 42 is lower than the surface roughness Ra of the low-gloss region 41. Thus, the difference in gloss between the low-gloss region 41 and the high-gloss region 42 can be further highlighted. Specifically, the surface roughness Ra of the high-gloss region 42 is preferably lower than 1.5 μm. The surface roughness Ra being lower than 1.5 μm facilitates increasing the gloss of the high-gloss region 42. The lower limit value of the surface roughness Ra of the high-gloss region 42 is, for example, 0.01 μm but is not particularly limited to this example.

The surface of the construction material 100 includes at least one or more high-gloss regions 42. The gloss, the surface roughness Ra, the size, and the shape of one high-gloss region 42 are not particularly limited. When the surface of the construction material 100 includes a plurality of high-gloss regions 42, these high-gloss regions 42 may be the same or different in terms of the gloss, the surface roughness Ra, the size, and/or the shape. At the surface of the construction material 100, an area occupied by the at least one or more high-gloss regions 42 is not particularly limited.

<Method for Manufacturing Construction Material>

The construction material 100 according to the present embodiment is manufacturable by preparing the base material 5 and by applying both a means for increasing the surface roughness Ra and a means for reducing the surface roughness Ra to the first surface 501 of the base material 5. Examples of the means for increasing the surface roughness Ra includes, but are not particularly limited to, grinding. Examples of the means for reducing the surface roughness Ra includes, but are not particularly limited to, cast molding, pressing, and polishing. The means for increasing the surface roughness Ra and the means for reducing the surface roughness Ra may be selected in accordance with the material for the base material 5.

The means for increasing the surface roughness Ra is applied to the first surface 501 of the base material 5, thereby forming the low-gloss region 41. The low-gloss region 41 can have an uneven surface 410.

In contrast, the means for reducing the surface roughness Ra is applied to the first surface 501 of the base material 5, thereby forming the high-gloss region 42. The high-gloss region 42 can have an even surface 420. The even surface 420 includes a flat surface in strict sense and also includes, in addition to the flat surface, a surface whose degree of unevenness is less than the unevenness of the uneven surface 410 in the low-gloss region 41.

The construction material 100 shown in FIG. 1 is thus obtained. The construction material 100 includes two regions (the low-gloss region 41 and the high-gloss region 42) different from each other in gloss, thereby widening the range of expressible designs.

(2) Second Embodiment

A construction material 100 according to a second embodiment will be described below with reference to FIG. 2 and other figures. In the second embodiment, components similar to those in the first embodiment are denoted by the same reference signs as those in the first embodiment, and the detailed description thereof may be omitted.

<Construction Material>

Figure 2:
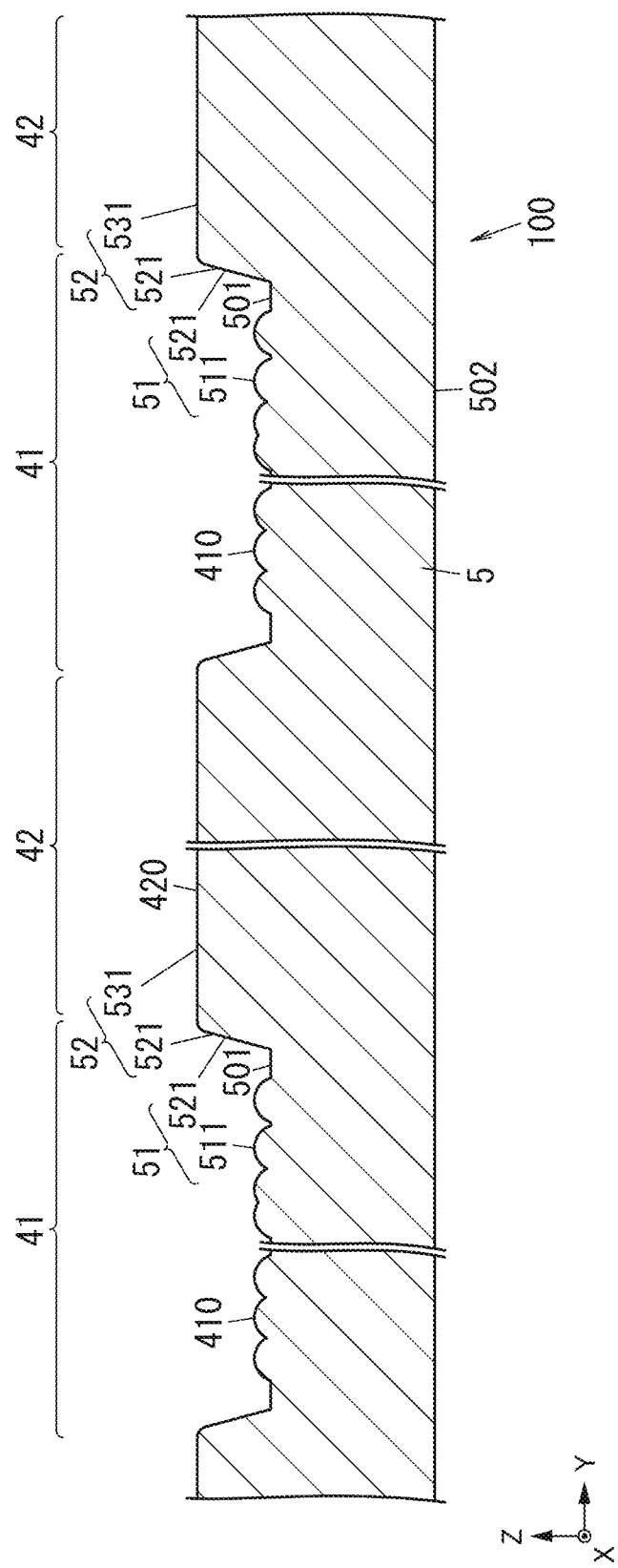
FIG. 2 is a schematic sectional view of a construction material according to a second embodiment.

FIG. 2 shows the construction material 100 according to the present embodiment. In the second embodiment, a base material 5 is different from the base material 5 (see FIG. 1) of the first embodiment. Specifically, in the present embodiment, the base material 5 has a recess 51 and a projection 52. There are at least one or more recesses 51 and at least one or more projections 52.

The recess 51 and the projection 52 are at a first surface 501 of the base material 5. That is, the first surface 501 is an uneven surface. A surface on an opposite side of the first surface 501 is a second surface 502 which is a flat surface.

Here, the uneven surface formed by the recess 51 and the projection 52 and the uneven surface 410 of the first embodiment are different in terms of the level or degree of unevenness. That is, examples of the recess 51 of the base material 5 include, but are not particularly limited to, a joint. That is, the recess 51 has a groove shape. The shape of the recess 51 in the XY plan view is not particularly limited. For example, in the XY plan view, the recess 51 may be extended in one fixed direction (X-axis direction or Y-axis direction) or may be extended in both the X-axis direction and the Y-axis direction to form a lattice shape. When the recess 51 of the base material 5 is a joint, the projection 52 of the base material 5 is a portion other than the joint (e.g., tile-like portion) (e.g., see FIG. 10 described later).

The first surface 501 includes a bottom surface 511, an inner side surface 521, and an outer surface 531. The inner side surface 521 is a surface between the bottom surface 511 and the outer surface 531.

The recess 51 is constituted by the bottom surface 511 and the inner side surface 521. The projection 52 is constituted by the outer surface 531 and the inner side surface 521. Since the recess 51 and the projection 52 are relative concepts, the inner side surface 521 serves as a constituent element of both the recess 51 and the projection 52.

When the base material 5 is horizontally held with the first surface 501 of the base material 5 facing upward (in the positive direction of the Z-axis) and the second surface 502 facing downward (in the negative direction of the Z-axis), the outer surface 531 is located higher than the bottom surface 511. That is, there is a difference in height between the bottom surface 511 and the outer surface 531.

The first surface 501 includes a low-gloss region 41 and a high-gloss region 42. In the present embodiment, the low-gloss region 41 is at the recess 51 as shown in FIG. 2. More specifically, the bottom surface 511 of the recess 51 includes the low-gloss region 41. The projection 52 includes the high-gloss region 42. More specifically, the outer surface 531 of the projection 52 includes the high-gloss region 42.

Thus, there is a difference in height between two regions (between the low-gloss region 41 and the high-gloss region 42) which are different from each other in gloss. According to the present embodiment, both the two regions (the low-gloss region 41 and the high-gloss region 42) different from each other in gloss are provided, and in addition, there is a difference in height between these regions, and therefore, the range of expressible designs can be further widened.

<Method for Manufacturing Construction Material>

The construction material 100 according to the present embodiment is manufacturable basically in a similar manner to the first embodiment. The means for increasing the surface roughness Ra is applied to the bottom surface 511 of the recess 51 of the base material 5, thereby forming the low-gloss region 41. The low-gloss region 41 can have an uneven surface 410. The means for reducing the surface roughness Ra is applied to the outer surface 531 of the projection 52 of the base material 5, thereby forming the high-gloss region 42. The high-gloss region 42 can have an even surface 420.

The construction material 100 shown in FIG. 2 is thus obtained. The construction material 100 includes two regions (the low-gloss region 41 and the high-gloss region 42) different from each other in gloss, thereby widening the range of expressible designs. In addition, there is a difference in height between these regions, and therefore, the range of expressible designs can be further widened.

(3) Third Embodiment

A decorative member 10 according to a third embodiment will be described below with reference to FIG. 3 and other figures. In the third embodiment, components similar to those in the first and second embodiments are denoted by the same reference signs as those in the first and second embodiments, and the detailed description thereof may be omitted.
<Decorative Member>

Figure 3:
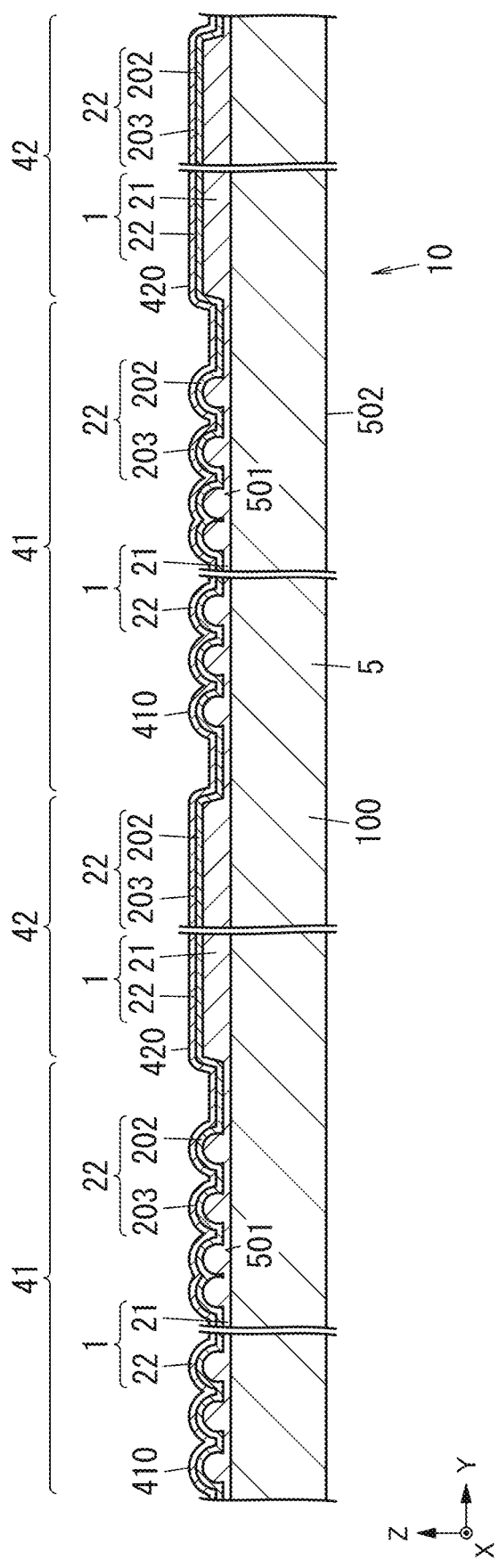
FIG. 3 is a schematic sectional view of a decorative member according to a third embodiment.

FIG. 3 shows the decorative member 10 according to the present embodiment. The decorative member 10 is used, for example, as an external material, in a similar manner to the construction material 100. The decorative member 10 is a plate-like member. The decorative member 10 has a substantially rectangular shape in the XY plan view.

The decorative member 10 according to the present embodiment includes the construction material 100 and a coating film structure 1.

The construction material 100 includes a base material 5. In the present embodiment, a first surface 501 and a second surface 502 of the base material 5 are flat surfaces. That is, the base material 5 has a flat plate shape.

The coating film structure 1 is formed on the construction material 100. Specifically, the coating film structure 1 is formed on the first surface 501 of the base material 5. When the decorative member 10 is used as an exterior material, the decorative member 10 is attached to an appropriate site with the coating film structure 1 facing outdoors and the base material 5 facing indoors. Examples of the appropriate site include walls and roofs of buildings.

In the present embodiment, the coating film structure 1 includes an undercoat film 21 and a topcoat film 22. The coating film structure 1 has a surface including a low-gloss region 41 and a high-gloss region 42.

The undercoat film 21 is formed on the first surface 501 of the base material 5. The undercoat film 21 is a coating film colored in an appropriate color.

The topcoat film 22 is formed on the undercoat film 21. The topcoat film 22 is a transparent or semi-transparent coating film. Thus, the undercoat film 21 is visible through the topcoat film 22. Note that the topcoat film 22 is not limited to the transparent or semi-transparent coating film but may be a non-transparent coating film (e.g., enamel coating film).

The topcoat film 22 includes at least one or more layers. In the present embodiment, the topcoat film 22 includes an inorganic layer 202 and a photocatalyst layer 203.

The inorganic layer 202 is formed on the undercoat film 21. As described above, the inorganic layer 202 is disposed between the undercoat film 21 and the photocatalyst layer 203. Thus, the inorganic layer 202 suppresses the undercoat film 21 and the photocatalyst layer 203 from being in contact with each other, and therefore, the deterioration of the undercoat film 21 caused by the photocatalyst layer 203 is less likely to advance.

The photocatalyst layer 203 is formed on the inorganic layer 202. In the present embodiment, the photocatalyst layer 203 has a surface serving as a surface of the topcoat film 22. Thus, the surface of the topcoat film 22 serves as the surface of the coating film structure 1, that is, a surface of the decorative member 10. That is, the surface of the coating film structure 1 is an outermost surface of the decorative member 10. The outermost surface is a surface located on an outermost side when the decorative member 10 is used as the exterior material.

The photocatalyst layer 203 is a layer including a photocatalyst (e.g., titanium oxide). The photocatalyst layer 203 is located on the outermost side of the coating film structure 1. Thus, when the decorative member 10 is attached as the exterior material to an appropriate site, grime which may adhere to the surface of the decorative member 10 is decomposed by solar light (in particular, ultraviolet), thereby weakening the adhesion of the grime. When it rains, rainwater can rinse away the grime. In addition, the photocatalyst layer 203 can also make harmful substances (e.g., NOx) in the air harmless.

As described above, the surface of the coating film structure 1 includes the low-gloss region 41 and the high-gloss region 42. The low-gloss region 41 includes an uneven surface 410. The uneven surface 410 is not particularly limited but may be, for example, a crease-like uneven surface having a crepe pattern. The high-gloss region 42 includes an even surface 420.
<Method for Manufacturing Decorative Member>

A method for manufacturing the decorative member 10 according to the present embodiment includes a base material preparation step, an undercoat film forming step, and a topcoat film forming step. Each of the steps will be described below.

The base material preparation step is a step of preparing the base material 5. A sealing agent (sealer) is applied to the first surface 501 of the base material 5, as necessary.

The undercoat film forming step is a step of forming the undercoat film 21. Specifically, an undercoat material is applied to the first surface 501 of the base material 5 and is dried or hardened, thereby forming the undercoat film 21. Here, publicly known enamel coating may be used as the undercoat material.

The topcoat film forming step is a step of forming the topcoat film 22. Specifically, a topcoat material is applied to the undercoat film 21, thereby forming the topcoat film 22.

The topcoat material includes inorganic coating and photocatalytic coating. First, the inorganic coating is applied to the undercoat film 21, thereby forming the inorganic layer 202. Then, the photocatalytic coating is applied to the inorganic layer 202, thereby forming the photocatalyst layer 203.

In the present embodiment, crease-like unevenness formed in a drying process of the coating forms the uneven surface 410 in the low-gloss region 41. For example, the uneven surface 410 may be formed by rapidly heating only a part to be formed into the low-gloss region 41 in the undercoat film forming step and/or the topcoat film forming step. Alternatively, the uneven surface 410 may be formed by performing wrinkle coating (crystal coating) on only the part to be formed into the low-gloss region 41.

In contrast, a part to be formed into the high-gloss region 42 may be slowly heated or subjected to normal coating, thereby forming the even surface 420 therein. Alternatively, ultraviolet curing coating may be adopted to form the high-gloss region 42. The ultraviolet curing coating is easily cured at a desired timing. Thus, the ultraviolet curing coating is applied to the part to be formed into the high-gloss region 42 and is cured before the ultraviolet curing coating spreads, thereby forming a thick coating film. The thick coating film forms the high-gloss region 42.

Alternatively, foam coating (e.g., urethane-based foam coating) may be adopted to from the low-gloss region 41 and the high-gloss region 42. That is, the foam coating is, first of all, applied to the entirety of the first surface 501 of the base material 5. Then, a prescribed pressure is applied to only the part to be formed into the high-gloss region 42, thereby pressing a foamed portion. The high-gloss region 42 is thus formed. Meanwhile, a foamed portion remains in a portion to which no prescribed pressure is applied. The low-gloss region 41 is thus formed.

The base material preparation step, the undercoat film forming step, and the topcoat film forming step described above are performed, thereby providing the decorative member 10 shown in FIG. 3. The decorative member 10 includes two regions (the low-gloss region 41 and the high-gloss region 42) different from each other in gloss, thereby widening the range of expressible designs.

(4) Fourth Embodiment

A decorative member 10 according to a fourth embodiment will be described below with reference to FIG. 4 and other figures. In the fourth embodiment, components similar to those in the first to third embodiments are denoted by the same reference signs as those in the first to third embodiments, and the detailed description thereof may be omitted.
<Decorative Member>

Figure 4:
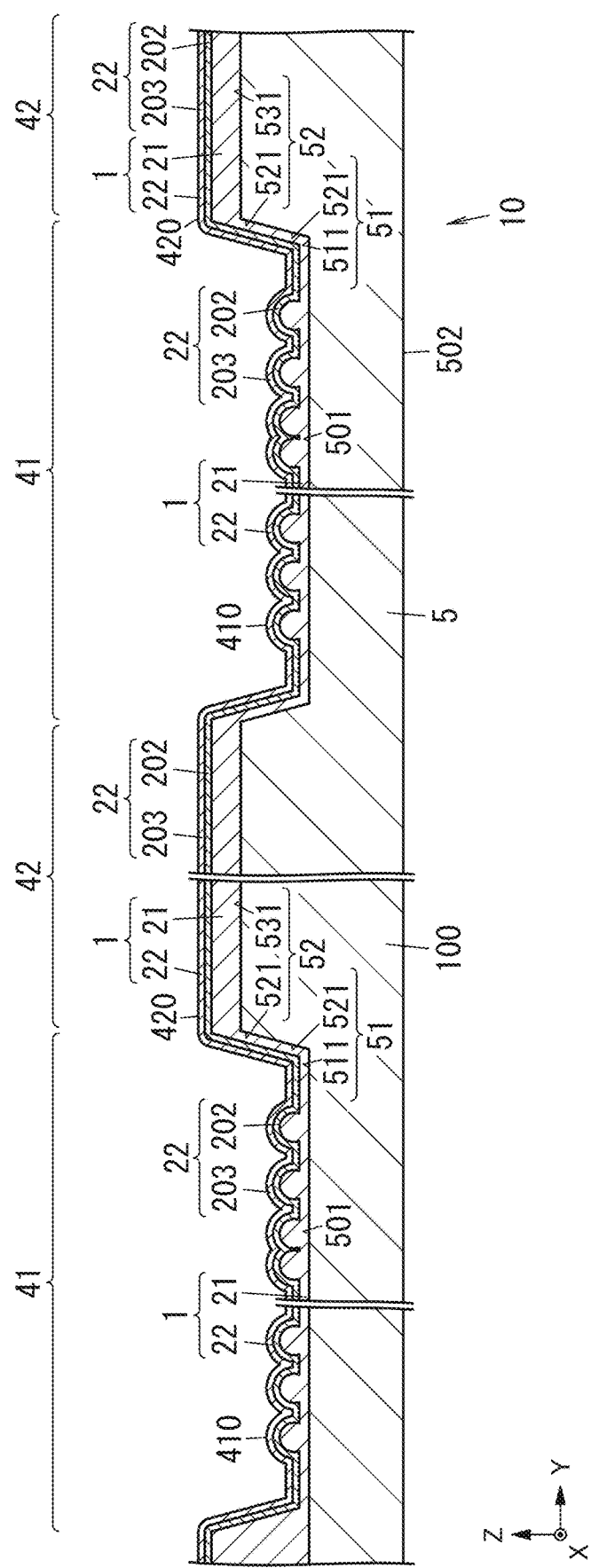
FIG. 4 is a schematic sectional view of a decorative member of a fourth embodiment.

FIG. 4 shows the decorative member 10 according to the present embodiment. In the fourth embodiment, a base material 5 is different from the base material 5 (see FIG. 3) of the third embodiment. Specifically, in the present embodiment, the base material 5 has a recess 51 and a projection 52. There are at least one or more recesses 51 and at least one or more projections 52.

The base material 5 has a first surface 501 including a low-gloss region 41 and a high-gloss region 42. In the present embodiment, the low-gloss region 41 is at the recess 51 as shown in FIG. 4. More specifically, the recess 51 has a bottom surface 511 including the low-gloss region 41. The projection 52 includes the high-gloss region 42. More specifically, the projection 52 has an outer surface 531 including the high-gloss region 42. Thus, there is a difference in height between two regions (between the low-gloss region 41 and the high-gloss region 42) which are different from each other in gloss.

Therefore, according to the present embodiment, both the two regions (the low-gloss region 41 and the high-gloss region 42) different from each other in gloss are provided, and in addition, there is a difference in height between these regions, and therefore, the range of expressible designs can be further widened.
<Method for Manufacturing Decorative Member>

The decorative member 10 according to the present embodiment is manufacturable basically in a similar manner to the third embodiment. The bottom surface 511 of the recess 51 of the base material 5 may be rapidly heated at the time of forming an undercoat film 21 and/or a topcoat film 22, thereby forming an uneven surface 410. Alternatively, the uneven surface 410 may be formed by performing wrinkle coating (crystal coating) on the bottom surface 511 of the recess 51 of the base material 5. The outer surface 531 of the projection 52 of the base material 5 may be slowly heated or may be subjected to normal coating at the time of forming the undercoat film 21 and/or the topcoat film 22, thereby forming an even surface 420.

The decorative member 10 as shown in FIG. 4 is thus obtained. The decorative member 10 has two regions (the low-gloss region 41 and the high-gloss region 42) different from each other in gloss, thereby widening the range of expressible designs. In addition, there is a difference in height between these regions, and therefore, the range of expressible designs can be further widened.

(5) Fifth Embodiment

A decorative member 10 according to a fifth embodiment will be described below with reference to FIG. 5 and other figures. In the fifth embodiment, components similar to those in the first to fourth embodiments are denoted by the same reference signs as those in the first to fourth embodiments, and the detailed description thereof may be omitted.
<Decorative Member>

Figure 5:
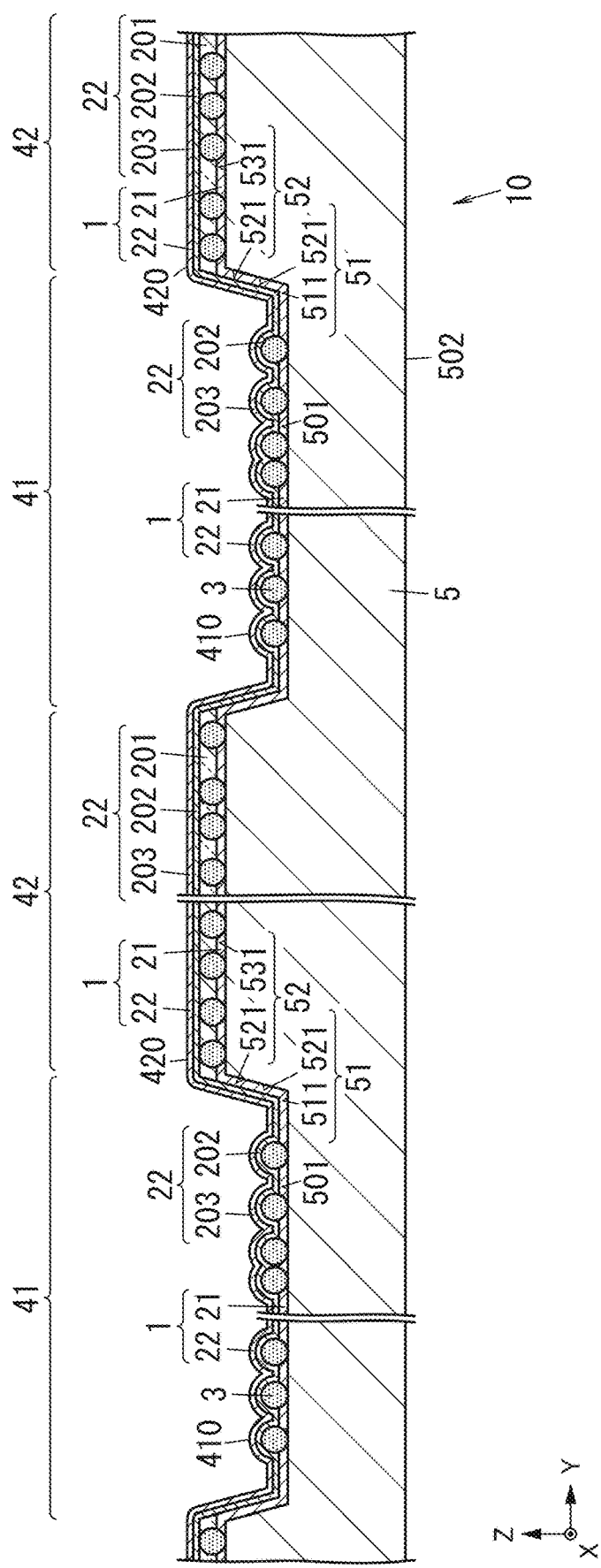
FIG. 5 is a schematic sectional view of a decorative member according to a fifth embodiment.

FIG. 5 shows the decorative member 10 according to the present embodiment. The fifth embodiment is different from the fourth embodiment (see FIG. 4) in that an undercoat film 21 includes an aggregate 3.

As described above, the undercoat film 21 in the present embodiment includes the aggregate 3. The aggregate 3 is an aggregate of particles of an organic material or an inorganic material. Examples of the aggregate 3 are not particularly limited but include beads (color beads), sand, siliceous sand (quartz sand, silica sand), color sand, color chips, mineral chips, glass chips, and woody chips.

Here, "the undercoat film 21 includes the aggregate 3" means that the aggregate 3 is at least partially embedded in the undercoat film 21. More specifically, "the undercoat film 21 includes the aggregate 3" means that each of the particles constituting the aggregate 3 is at least partially embedded in the undercoat film 21 (see FIG. 5). Note that the individual particles constituting the aggregate 3 are uniformly or nonuniformly dispersed on a first surface 501 of a base material 5 in the XY plan view.

When the undercoat film 21 includes the aggregate 3, the average particle size of the aggregate 3 is greater than the thickness of the undercoat film 21. In the present specification, the "average particle size" means a median diameter (50% size). The average particle size of the aggregate 3 is obtained by, for example, measurement with a laser diffraction particle size distribution measurement device. As described above, when the average particle size of the aggregate 3 is greater than the thickness of the undercoat film 21, many of the particles constituting the aggregate 3 are more likely to protrude at places on the surface of the undercoat film 21 as shown in FIG. 5. The average particle size of the aggregate 3 is not particularly limited but may be, for example, greater than or equal to 2 μm and less than or equal to 1000 μm.

In the present embodiment, in a low-gloss region 41, the thickness of a topcoat film 22 is less than the difference between the average particle size of the aggregate 3 and the thickness of the undercoat film 21. As described above, the average particle size of the aggregate 3 is greater than the thickness of the undercoat film 21, and therefore, many of the particles constituting the aggregate 3 are more likely to protrude at places of the surface of the undercoat film 21. In addition, since the thickness of the topcoat film 22 is less than the difference between the average particle size of the aggregate 3 and the thickness of the undercoat film 21, the low-gloss region 41 has an uneven surface 410 formed by the aggregate 3 as shown in FIG. 5. That is, in the low-gloss region 41, the topcoat film 22 is formed in the form of a thin membrane on the surface of the aggregate 3 protruding from the surface of the undercoat film 21. In other words, the surface of the topcoat film 22 in the low-gloss region 41 is not a flat surface in strict sense but is the uneven surface 410 formed by the aggregate 3. Thus, it becomes easy to form the low-gloss region 41 to have a surface roughness Ra of greater than or equal to 1.5 μm.

In the present embodiment, the topcoat film 22 in a high-gloss region 42 has a thickness greater than or equal to the difference between the average particle size of the aggregate 3 and the thickness of the undercoat film 21. In this case, many of the particles constituting the aggregate 3 are fully embedded in the topcoat film 22 as shown in FIG. 5. Thus, the surface of the topcoat film 22 in the high-gloss region 42 can be an even surface 420.

The topcoat film 22 includes at least one or more layers. In the present embodiment, the topcoat film 22 includes an inorganic layer 202 and a photocatalyst layer 203. The topcoat film 22 may further include a clear layer 201. In the present embodiment, the topcoat film 22 in the low-gloss region 41 includes the inorganic layer 202 and the photocatalyst layer 203. The topcoat film 22 in the high-gloss region 42 includes the inorganic layer 202, the photocatalyst layer 203, and the clear layer 201. The clear layer 201 does not have to include a pigment but may include a colorant (pigment and/or dye) as long as the colorant does not make the clear layer 201 non-transparent. This enables the clear layer 201 according to the hue of the colorant to be formed. Thus, the range of expressible designs can be further widened. Note that the topcoat film 22 may include a non-transparent layer (not shown) in place of the clear layer 201. The non-transparent layer may be formed from non-transparent coating (e.g., enamel coating). The case where the topcoat film 22 including the clear layer 201 and the case where the topcoat film 22 including the non-transparent layer are compared with each other. In both of the cases, the high-gloss region 42 can be formed, but in the former case, gloss tends to be higher than in the latter case.

In the low-gloss region 41, the inorganic layer 202 is formed on the undercoat film 21. As described above, the inorganic layer 202 is disposed between the undercoat film 21 and the photocatalyst layer 203. Thus, the inorganic layer 202 suppresses the undercoat film 21 and the photocatalyst layer 203 from being in contact with each other, and therefore, the deterioration of the undercoat film 21 caused by the photocatalyst layer 203 is less likely to advance.

In the high-gloss region 42, the clear layer 201 is formed on the undercoat film 21. The inorganic layer 202 is formed on the clear layer 201. As described above, the inorganic layer 202 is disposed between the clear layer 201 and the photocatalyst layer 203. Thus, the inorganic layer 202 suppresses the clear layer 201 and the photocatalyst layer 203 from being in contact with each other, and therefore, the deterioration of the clear layer 201 caused by the photocatalyst layer 203 is less likely to advance.

In the present embodiment, the low-gloss region 41 is at a recess 51 as shown in FIG. 5. More specifically, the recess 51 has a bottom surface 511 including the low-gloss region 41. The high-gloss region 42 is at a projection 52. More specifically, the projection 52 has an outer surface 531 including the high-gloss region 42. Thus, there is a difference in height between two regions (between the low-gloss region 41 and the high-gloss region 42) which are different from each other in gloss. According to the present embodiment, both the two regions (the low-gloss region 41 and the high-gloss region 42) different from each other in gloss are provided, and in addition, there is a difference in height between these regions, and therefore, the range of expressible designs can be further widened.

<Method for Manufacturing Decorative Member>

The method for manufacturing the decorative member 10 according to the present embodiment includes a base material preparation step, an undercoat film forming step, and a topcoat film forming step. Each of the steps will be described below.

Figure 6:
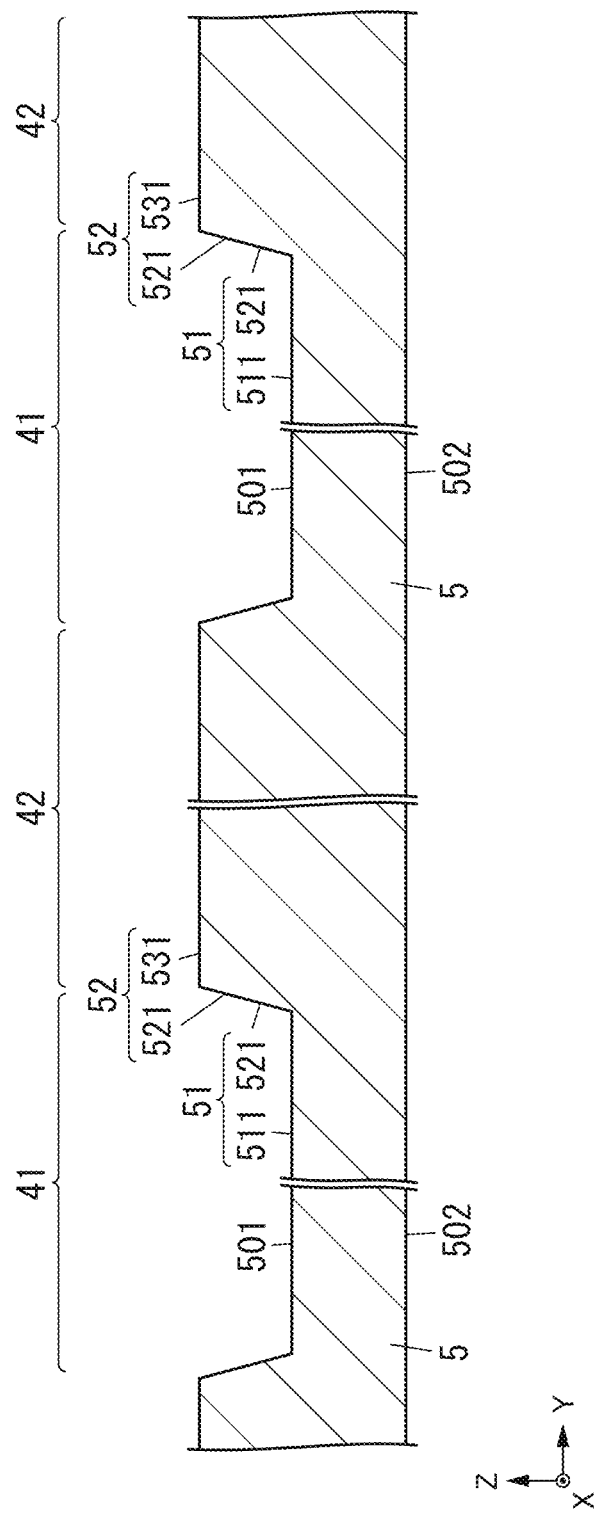
FIG. 6 is a schematic sectional view of a step in a method for manufacturing the decorative member of the fifth embodiment.

The base material preparation step is a step of preparing the base material 5 as shown in FIG. 6. The first surface 501 of the base material 5 has the recess 51 and the projection 52. A sealing agent is applied to the first surface 501 of the base material 5, as necessary.

Figure 7:
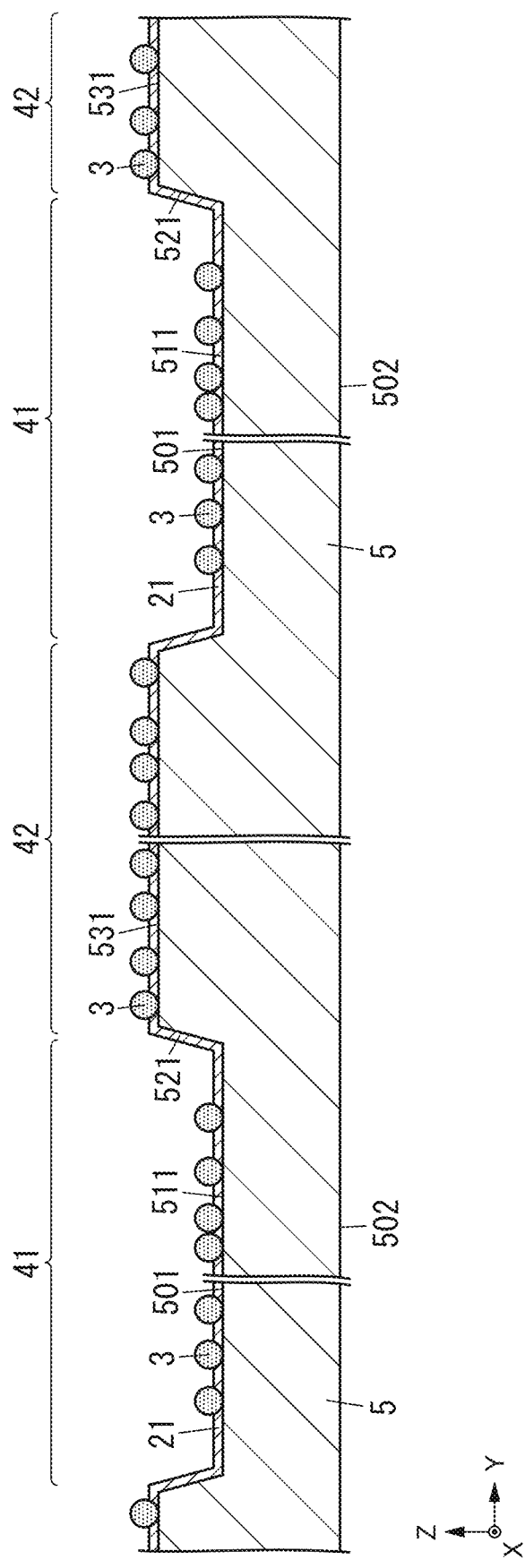
FIG. 7 is a schematic sectional view of a step in the method for manufacturing the decorative member of the fifth embodiment.

The undercoat film forming step includes applying an undercoat material to the recess 51 and the projection 52 formed at the first surface 501 of the base material 5 as shown in FIG. 7, and drying or hardening the undercoat material, thereby forming the undercoat film 21. The undercoat material includes the aggregate 3. The thickness of the undercoat film 21 is smaller than the average particle size of the aggregate 3. Thus, adjusting the thickness of the undercoat film 21 can make many of the particles constituting the aggregate 3 protrude at places on the surface of the undercoat film 21.

Here, at the time of applying the undercoat material (coating including the aggregate 3) to the first surface 501 of the base material 5, a spray or the like may be used. That is, by using the spray, the undercoat material may be applied to both the recess 51 and the projection 52 of the first surface 501 of the base material 5. Moreover, when the spray is used, the undercoat material can be selectively applied to the first surface 501 of the base material 5. That is, although illustrations are omitted, the undercoat material may be applied to only the recess 51 or to only the projection 52. Alternatively, the undercoat material may be applied regardless of the recess 51 and the projection 52. That is, the undercoat material may be applied to only a part of the recess 51 or to only a part of the projection 52. In addition, as described in the third embodiment, adopting ultraviolet curing coating to form a high-gloss region 42 can increase the difference in gloss between the low-gloss region 41 and the high-gloss region 42, thereby making a balanced design.

The topcoat film forming step is a step of applying a topcoat material to the undercoat film 21 to form the topcoat film 22.

Here, a part to be formed into the low-gloss region 41 is the recess 51. The topcoat material for forming the topcoat film 22 in the recess 51 includes inorganic coating and photocatalytic coating. In contrast, a part to be formed into the high-gloss region 42 is the projection 52. The topcoat material for forming the topcoat film 22 on the projection 52 includes clear coating, inorganic coating, and photocatalytic coating. Publicly known coating may be used as the clear coating, the inorganic coating, and the photocatalytic coating. The clear coating includes colored clear coating. The colored clear coating is clear coating including a colorant (e.g., pigment and/or dye). Adopting the colored clear coating enables the clear layer 201 according to the hue of the colorant to be formed while the transparency is secured.

Figure 8:
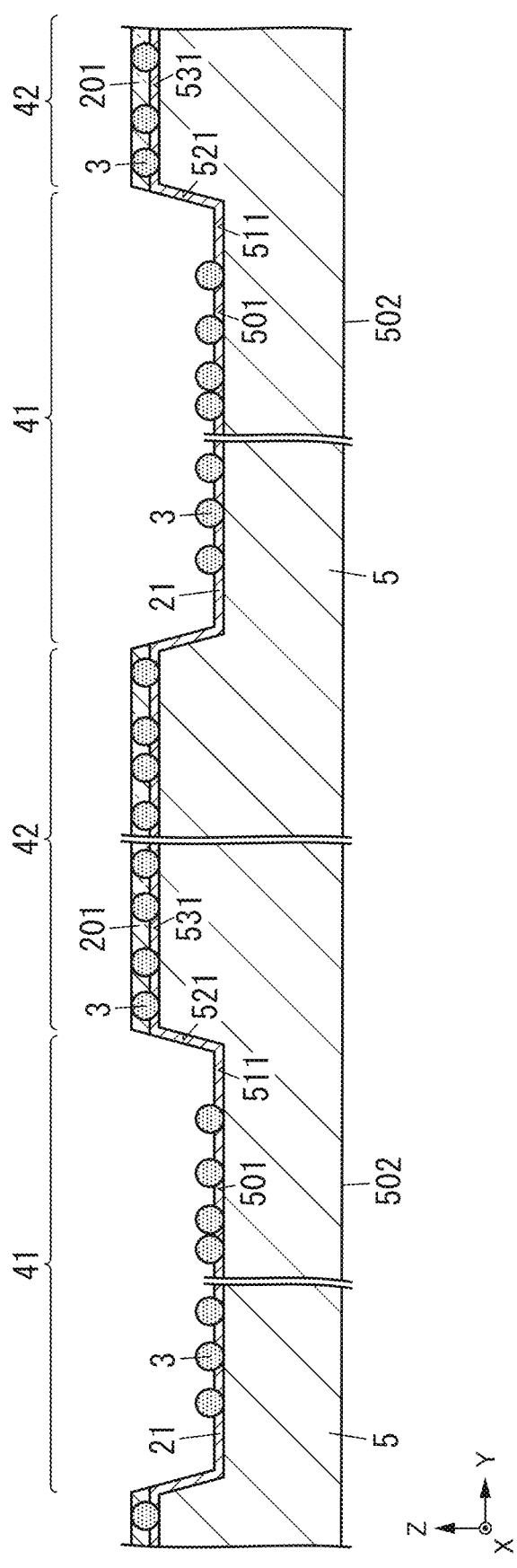
FIG. 8 is a schematic sectional view of a step in the method for manufacturing the decorative member of the fifth embodiment.

First, as shown in FIG. 8, the clear coating is applied to the undercoat film 21 on the projection 52 in the part to be formed into the high-gloss region 42, thereby forming the clear layer 201. The clear coating is preferably applied by roll coating for the sake of the simplicity of selective coating. That is, the outer surface 531 of the projection 52 is at a higher location than the bottom surface 511 of the recess 51. Therefore, in the case of the roll coating, the clear coating is easily applied to the undercoat film 21 on the projection 52 while avoiding the undercoat film 21 on the recess 51. In this way, on the projection 52, the aggregate 3 is embedded in the clear layer 201, so that the surface of the clear layer 201 is a flat surface. No clear layer 201 is formed on the undercoat film 21 on the recess 51.

Next, the inorganic coating is applied to the undercoat film 21 on the recess 51 and the clear layer 201 on the projection 52, thereby forming the inorganic layer 202. Then, the photocatalytic coating is applied to the inorganic layer 202, thereby forming a photocatalyst layer 203. As shown in FIG. 5, in the low-gloss region 41, the topcoat film 22 includes two layers, namely, the inorganic layer 202 and the photocatalyst layer 203, whereas in the high-gloss region 42, the topcoat film 22 includes three layers, namely, the clear layer 201, the inorganic layer 202, and the photocatalyst layer 203.

Here, on the recess 51 including the low-gloss region 41, the thickness of the topcoat film 22 is smaller than the difference between the average particle size of the aggregate 3 and the thickness of the undercoat film 21. In this way, adjusting the thickness of the topcoat film 22 enables a recess to be formed between the particles constituting the aggregate 3. Thus, in the low-gloss region 41, the uneven surface 410 can be formed by the aggregate 3.

On the projection 52 including the high-gloss region 42, the thickness of the topcoat film 22 is greater than or equal to than the difference between the average particle size of the aggregate 3 and the thickness of the undercoat film 21. In this way, adjusting the thickness of the topcoat film 22 enables many of the particles constituting the aggregate 3 to be fully embedded in the topcoat film 22, which enables the surface of the topcoat film 22 to be made into the even surface 420 (e.g., a flat surface).

The base material preparation step, the undercoat film forming step, and the topcoat film forming step described above are performed, thereby providing the construction material 100 shown in FIG. 5.

(6) Sixth Embodiment

Figure 9:
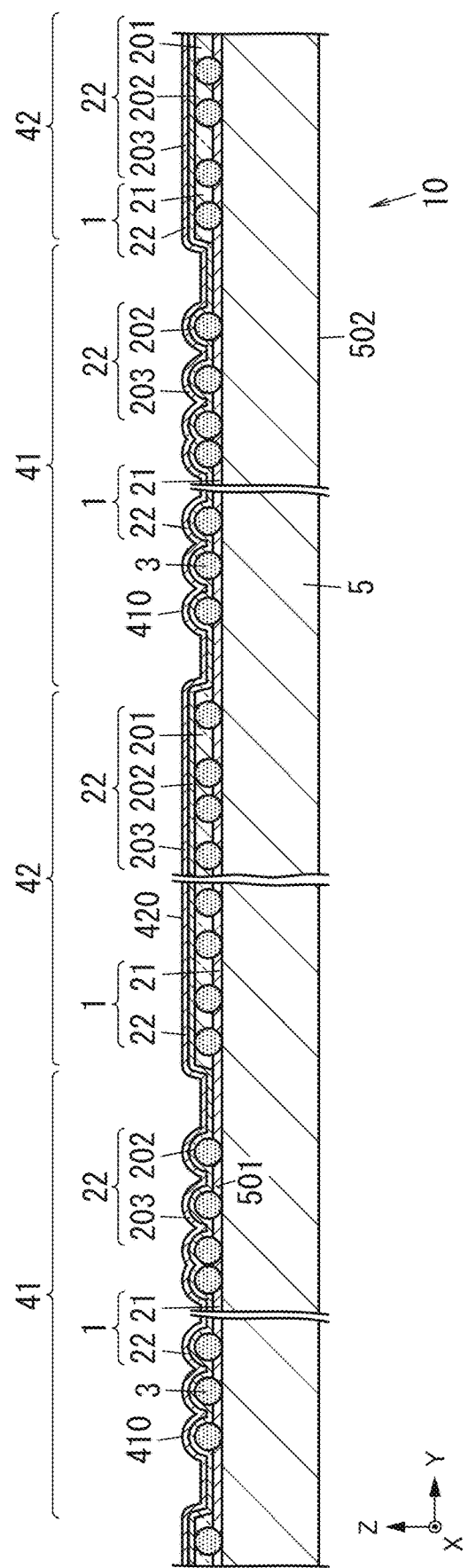
FIG. 9 is a schematic sectional view of a decorative member according to a sixth embodiment.

A decorative member 10 according to a sixth embodiment will be described below with reference to FIG. 9 and other figures. In the sixth embodiment, components similar to those in the first to fifth embodiments are denoted by the same reference signs as those in the first to fifth embodiments, and the detailed description thereof may be omitted.
<Decorative Member>
FIG. 9 shows the decorative member 10 according to the present embodiment. In the sixth embodiment, a base material 5 is different from the base material 5 (see FIG. 5) of the fifth embodiment. Specifically, in the present embodiment, a first surface 501 and a second surface 502 of the base material 5 are flat surfaces. That is, the base material 5 has a flat plate shape.

In the present embodiment, a coating film structure 1 includes an undercoat film 21 and a topcoat film 22. The coating film structure 1 has a surface including a low-gloss region 41 and a high-gloss region 42.
<Method for Manufacturing Decorative Member>
The method for manufacturing the decorative member 10 according to the present embodiment includes a base material preparation step, an undercoat film forming step, and a topcoat film forming step. Each of the steps will be described below.

The base material preparation step is a step of preparing the base material 5. A sealing agent (sealer) is applied to the first surface 501 of the base material 5, as necessary.

The undercoat film forming step is a step of forming the undercoat film 21. Specifically, an undercoat material is applied to the first surface 501 of the base material 5 and is dried or hardened, thereby forming the undercoat film 21. The undercoat material includes an aggregate 3. The thickness of the undercoat film 21 is smaller than the average particle size of the aggregate 3. Thus, adjusting the thickness of the undercoat film 21 can make many of particles constituting the aggregate 3 protrude at places on the surface of the undercoat film 21.

The topcoat film forming step is a step of forming the topcoat film 22. Specifically, a topcoat material is applied to the undercoat film 21, thereby forming the topcoat film 22. However, a part to be formed into the low-gloss region 41 and a part to be formed into the high-gloss region 42 are different from each other in terms of the formation method of the topcoat film 22.

In the part to be formed into the low-gloss region 41, the topcoat material includes inorganic coating and photocatalytic coating. In the part to be formed into the high-gloss region 42, the topcoat material includes clear coating, the inorganic coating, and the photocatalytic coating. Publicly known coating may be used as the clear coating, the inorganic coating, and the photocatalytic coating.

First, the clear coating or enamel coating is applied to the undercoat film 21 in the part to be formed into the high-gloss region 42, thereby forming a clear layer 201. Here, the aggregate 3 is embedded in the clear layer 201 so that the surface of the clear layer 201 is a flat surface. Note that the clear layer 201 is not formed on the undercoat film 21 in the part to be formed into the low-gloss region 41.

Then, the inorganic coating is applied to the undercoat film 21 in the part to be formed into the low-gloss region 41 and the clear layer 201 in the part to be formed into the high-gloss region 42, thereby forming an inorganic layer 202. Then, the photocatalytic coating is applied to the inorganic layer 202, thereby forming a photocatalyst layer 203.

In this way, in the low-gloss region 41, the topcoat film 22 includes two layers, namely, the inorganic layer 202 and the photocatalyst layer 203, whereas in the high-gloss region 42, the topcoat film 22 includes three layers, namely, the clear layer 201, the inorganic layer 202, and the photocatalyst layer 203.

Here, in the low-gloss region 41, the thickness of the topcoat film 22 is smaller than the difference between the average particle size of the aggregate 3 and the thickness of the undercoat film 21. In this way, adjusting the thickness of the topcoat film 22 enables a recess to be formed between the particles constituting the aggregate 3. After the topcoat film 22 is formed, measurement is performed by using a publicly known glossmeter to check that the 60° gloss value of the low-gloss region 41 is smaller than 8.

In the high-gloss region 42, the thickness of the topcoat film 22 is greater than or equal to the difference between the average particle size of the aggregate 3 and the thickness of the undercoat film 21. In this way, adjusting the thickness of the topcoat film 22 enables many of the particles constituting the aggregate 3 to be embedded in the topcoat film 22, which enables the surface of the topcoat film 22 to be made into a flat surface.

The base material preparation step, the undercoat film forming step, and the topcoat film forming step described above are performed, thereby providing the decorative member 10 shown in FIG. 9. The decorative member 10 includes two regions (the low-gloss region 41 and the high-gloss region 42) different from each other in gloss, thereby widening the range of expressible designs.

(7) Seventh Embodiment

A construction material 100 according to a seventh embodiment will be described below with reference to FIG. 10 and other figures. In the seventh embodiment, components similar to those in the first to sixth embodiments are denoted by the same reference signs as those in the first to sixth embodiments, and the detailed description thereof may be omitted.

<Construction Material>

Figure 10:
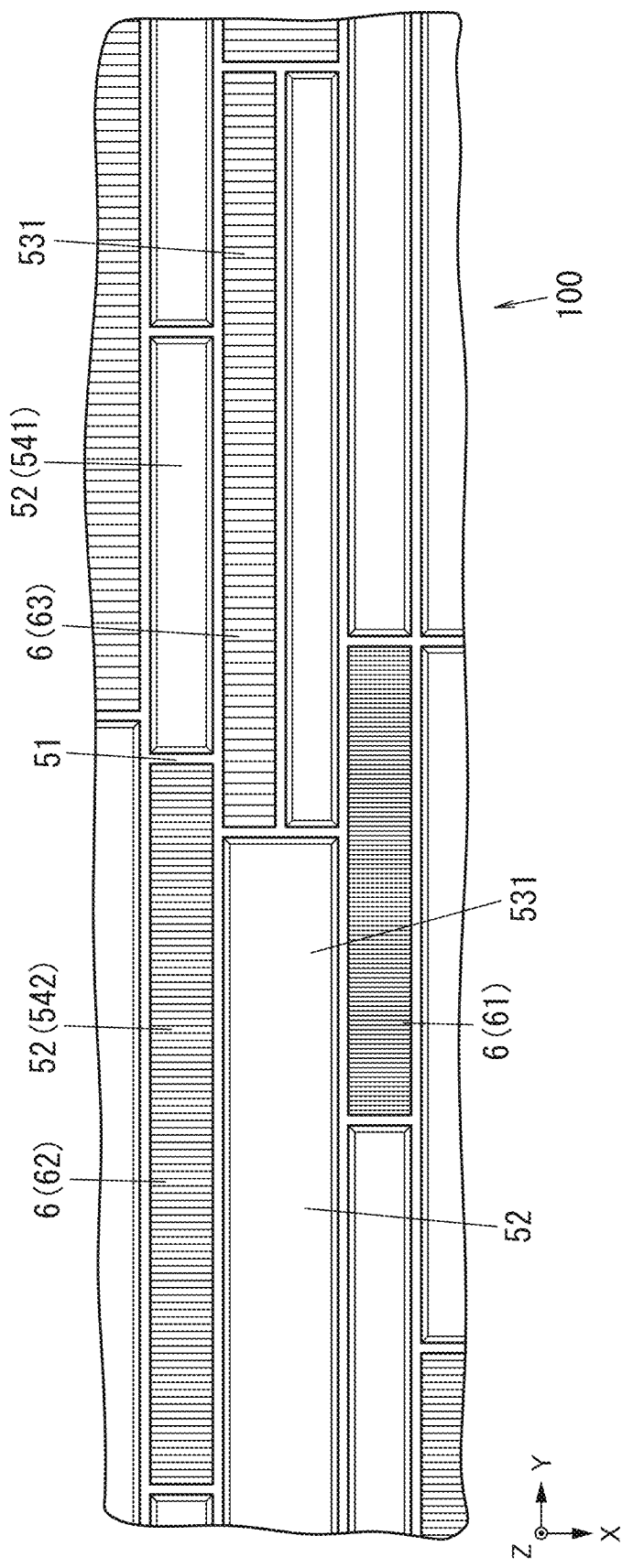
FIG. 10 is a schematic plan view of a construction material according to a seventh embodiment.
Figure 11:
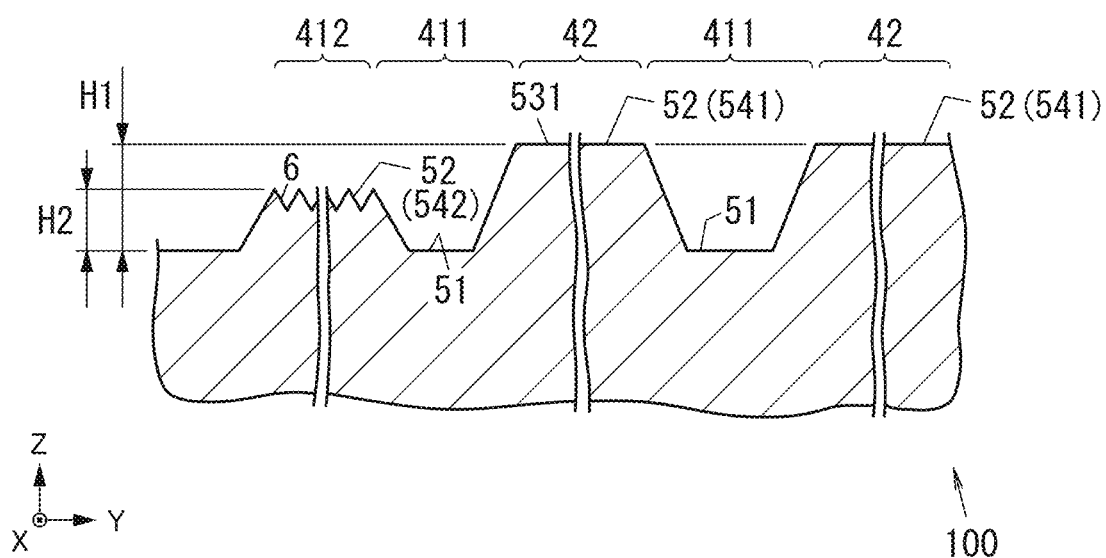
FIG. 11 is a schematic sectional view of a main part of the construction material of the seventh embodiment.

FIGS. 10 and 11 show the construction material 100 according to the present embodiment. In the seventh embodiment, a base material 5 is different from the base material 5 (see FIG. 2) of the second embodiment.

Specifically, the present embodiment includes a plurality of projections 52 as shown in FIG. 11. The height H1 of each of at least one or more projections 52 (e.g., a first projection 541) of the plurality of projections 52 is different from the height(s) H2 of the remaining projection(s) 52 (e.g., a second projection 542). That is, in the present embodiment, there is a difference in height (H1-H2) between outer surfaces 531 of the plurality of projections 52 (in the present embodiment, the first projection 541 and the second projection 542). As described above, there is the difference in height between the plurality of projections 52, and therefore, the range of expressible designs can be further widened. Note that the height of each projection 52 means the length from a bottom surface 511 of a recess 51 to the outer surface 531 of the corresponding one of the projections 52 in the Z-axis direction.

Moreover, in the present embodiment, as shown in FIGS. 10 and 11, a plurality of raised parts 6 are extended in one direction (in the present embodiment, in the X-axis direction) on the surfaces (outer surfaces 531) of the at least one or more projections 52. Examples of the cross section shape of each raised part 6 are not particularly limited but include a semicircular shape, an elliptical shape, a triangular shape, a trapezoidal shape, and a rectangular shape. In the present embodiment, as shown in FIG. 11, the plurality of raised parts 6 are on the surface of the second projection 542, but the surface of the first projection 541 is provided with no raised part 6. Thus, while the second projection 542 can be made glossier than the recess 51, but the second projection 542 can be made less glossy than the first projection 541. That is, the construction material 100 according to the present embodiment may include at least three or more regions different from each other in gloss (in the present embodiment, a first low-gloss region 411, a second low-gloss region 412, and a high-gloss region 42) (see FIG. 11). Thus, the range of expressible designs can be further widened.

Here, the surfaces (outer surfaces 531) of the at least one or more of the projections 52 may be tilted at arbitrary angles in arbitrary directions with respect to the XY plane. For example, also when the plurality of raised parts 6 are on the surfaces of two projections 52 in the same manner, different tilted directions and tilted angles of these projections 52 may result in low gloss or high gloss. Thus, the range of expressible designs can be further widened.

Moreover, when a plurality of raised parts 6 are on each of the surfaces of the plurality of projections 52, these raised parts 6 on the plurality of projections 52 may be the same or different in terms of at least any of the thickness, the interval, and the depth. In the present embodiment, as shown in FIG. 10, there are two or more types of raised parts 6 (first raised parts 61, second raised parts 62, and third raised parts 63). For example, the first raised parts 61, the second raised parts 62, and the third raised parts 63 become thicker in this order. In this way, the plurality of projections 52 can be made different from each other in gloss. Thus, the range of expressible designs can be further widened.

Note that the thickness of each raised part 6 means the width of one raised part 6 in a direction vertical to one direction (in the present embodiment, the Y-axis direction) in the XY plan view. In the present embodiment, the thickness of each first raised part 61 is greater than or equal to 1.0 mm and less than or equal to 1.5 mm, the thickness of each second raised part 62 is greater than or equal to 1.5 mm and less than or equal to 2.0 mm, the thickness of each third raised part 63 is greater than or equal to 2.5 mm and less than or equal to 3.5 mm, but these thicknesses are not limited to these examples.

Moreover, the interval between the raised parts 6 means a pitch between two adjacent raised parts 6 in the direction vertical to the one direction (in the present embodiment, the Y-axis direction) in the XY plan view.

Moreover, the depth of each raised part 6 means the projection length of the raised part 6 in the Z-axis direction. In the present embodiment, the depth of each first raised part 61 is 0.7 mm, the depth of each second raised part 62 is 0.9 mm, and the depth of each third raised part 63 is 1.0 mm, but the depths are not limited to these examples.

In the present embodiment, the dimensional ratio of the first raised parts 61, the second raised parts 62, and the third raised parts 63 is that the thickness and the depth of each second raised part 62 are both greater than or equal to 1.2, and the thickness and the depth of each third raised part 63 are both greater than or equal to 1.4, provided that the thickness and the depth of each first raised part 61 are both 1.0, but this dimensional ratio is not limited to this example.

(8) Eighth Embodiment

A decorative member 10 according to an eighth embodiment will be described below with reference to FIG. 12 and other figures. In the eighth embodiment, components similar to those in the first to seventh embodiments are denoted by the same reference signs as those in the first to seventh embodiments, and the detailed description thereof may be omitted.

<Decorative Member>

Figure 12:
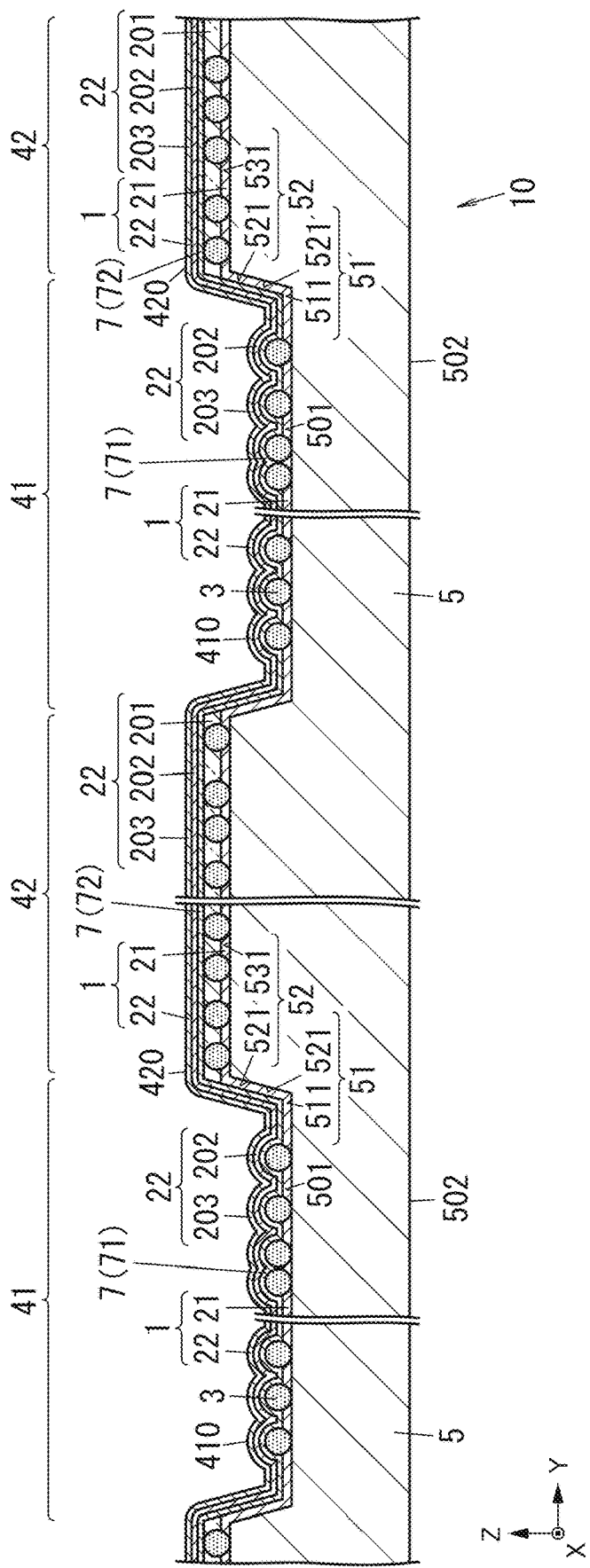
FIG. 12 is a schematic sectional view of a decorative member according to an eighth embodiment.

FIG. 12 shows the decorative member 10 according to the present embodiment. The eighth embodiment is different from the fifth embodiment (see FIG. 5) in that a coating film structure 1 further includes a print layer 7.

In the present embodiment, the print layer 7 is provided directly under an inorganic layer 202 (in the negative orientation of the Z-axis). The print layer 7 may be formed by, for example, inkjet printing. Thus, the print layer 7 includes an ink absorbing layer. The ink absorbing layer is a layer for absorbing ink to fix a color material such as a dye and pigment and is not particularly limited.

In the XY plan view, the pattern of the print layer 7 is not particularly limited. In accordance with the pattern of the print layer 7, the range of expressible designs can be further widened.

In particular, in the present embodiment, as shown in FIG. 12, the pattern of the print layer 7 (a first print layer 71) in a low-gloss region 41 and the pattern of the print layer 7 (a second print layer 72) in a high-gloss region 42 are different from each other. For example, of two patterns of natural things different from each other in gloss (e.g., rock and mineral), the pattern of a low-gloss natural thing is printed in the low-gloss region 41 to form the first print layer 71, and the pattern of a high-gloss natural thing is printed in the high-gloss region 42 to form the second print layer 72. Specifically, in the present embodiment, the pattern of the first print layer 71 is a cray pattern, and the pattern of the second print layer 72 is a marble pattern. Thus, the print layer 7 has different patterns in the two regions (the low-gloss region 41 and the high-gloss region 42), and therefore, the range of expressible designs can be further widened.

(9) Variations

The present invention is not limited to the first to eighth embodiments. Various modifications may be made to the first to eighth embodiments depending on design and the like as long as the object of the present disclosure is achieved. Variations of the first to eighth embodiments described above will be enumerated below.

In each of the third to fifth embodiments, the topcoat film 22 includes a plurality of layers but may include a single layer.

In each of the third to fifth embodiments, the topcoat film 22 includes a photocatalyst, but the topcoat film 22 does not have to include the photocatalyst.

In the fifth embodiment, the undercoat film 21 includes the aggregate 3, but the topcoat film 22 may include an aggregate.

In each of the second, fourth, and fifth embodiments, the low-gloss region 41 is at the recess 51, and the high-gloss region 42 is at the projection 52, but this may be reversed. That is, the low-gloss region 41 may be at the projection 52, and the high-gloss region 42 may be at the recess 51.

In each of the sixth and seventh embodiments, the undercoat film 21 includes the aggregate 3, but the topcoat film 22 may include an aggregate.

In each of the sixth and seventh embodiments, the topcoat film 22 includes a plurality of layers but may include a single layer.

In each of the third to sixth embodiments and the eighth embodiment, the topcoat film 22 includes a photocatalyst, but the topcoat film 22 does not have to include the photocatalyst.

In each of the fourth, fifth, and eighth embodiments, the low-gloss region 41 is at the recess 51, and the high-gloss region 42 is at the projection 52, but this may be reversed. That is, the low-gloss region 41 may be at the projection 52, and the high-gloss region 42 may be at the recess 51.

The seventh embodiment is the construction material 100 including the base material 5 but may further include the coating film structure 1 so as to be the decorative member 10. In this case, the low-gloss region 41 may be formed by, for example, gravure offset printing, flexographic printing, or the like.

In the seventh embodiment, the projections 52 have two steps of height, namely, the height H1 of the first projection 541 and the height H2 of the second projection 542 but may have three or more steps of height.

In the seventh embodiment, the plurality of raised parts 6 extend in the X-axis direction but may extend in the Y-axis direction or may extend in a direction tilted with respect to the X-axis and the Y-axis.

In each of the first to eighth embodiments, a decorative sheet may be affixed to the outermost surface (surface in the positive orientation of the Z-axis direction) of the construction material 100 or the decorative member 10. The decorative sheet may be affixed to only the high-gloss region 42.

(10) Aspects

As can be seen from the embodiments and variations described above, the present invention includes the following aspects. In the following description, reference signs in parentheses are added only to clarify the correspondence relationship to the embodiment.

A first aspect is a construction material (100) including a base material (5). The base material (5) has a low-gloss region (41) having a 60° gloss value of smaller than 8 and a high-gloss region (42) having a 60° gloss value of larger than or equal to 8. The 60° gloss value of the low-gloss region (41) and the 60° gloss value of the high-gloss region (42) are different from each other by 5 or greater.

With this aspect, two regions different from each other in gloss are provided, thereby widening the range of expressible designs.

A second aspect is a construction material (100) based on the first aspect. In the second aspect, the 60° gloss value of the high-gloss region (42) is larger than or equal to 70 and smaller than or equal to 150.

With this aspect, the range of expressible designs can be further widened.

A third aspect is a construction material (100) based on the first or second aspect. In the third aspect, the low-gloss region (41) has a surface roughness Ra of greater than or equal to 1.5 µm.

With this aspect, the range of expressible designs can be further widened.

A fourth aspect is a construction material (100) based on any one of the first to third aspects. In the fourth aspect, the high-gloss region (42) has a surface roughness Ra lower than a surface roughness Ra of the low-gloss region (41).

With this aspect, the range of expressible designs can be further widened.

A fifth aspect is a construction material (100) based on any one of the first to fourth aspects. In the fifth aspect, the base material (5) has a recess (51) and a projection (52).

With this aspect, the range of expressible designs can be further widened.

A sixth aspect is a construction material (100) based on the fifth aspect. In the sixth aspect, the base material (5) has a plurality of the projections (52). At least one or more projections (52) of the plurality of projections (52) are each different from a remaining projection (52) in terms of height.

With this aspect, the range of expressible designs can be further widened.

A seventh aspect is a construction material (100) based on the fifth or sixth aspect. In the seventh aspect, the projection (52) has a surface provided with a plurality of raised parts (6) extending in one direction.

With this aspect, the range of expressible designs can be further widened.

An eighth aspect is a decorative member (10) including the construction material (100) of any one of the first to seventh aspects, and a coating film structure (1) on the construction material (100). The coating film structure (1) includes the low-gloss region (41) and the high-gloss region (42).

With this aspect, the range of expressible designs can be further widened.

A ninth aspect is a decorative member (10) of the eighth aspect. In the ninth aspect, the coating film structure (1) includes an undercoat film (21) on the base material (5) of the construction material (100) and a topcoat film (22) on the undercoat film (21). One coating film of the undercoat film (21) or the topcoat film (22) includes an aggregate (3). The aggregate (3) has an average particle size greater than a thickness of the one coating film. The low-gloss region (41) has an uneven surface (410) formed by the aggregate (3).

With this aspect, the range of expressible designs can be further widened.

A tenth aspect is a decorative member (10) of the ninth aspect. In the tenth aspect, the coating film structure (1) further includes a print layer (7).

With this aspect, the range of expressible designs can be further widened.

An eleventh aspect is a decorative member (10) based on the tenth aspect. In the eleventh aspect, the print layer (7) has a pattern in the low-gloss region (41) and a pattern in the high-gloss region (42). The pattern in the low-gloss region (41) and the pattern in the high-gloss region (42) are different from each other.

With this aspect, the range of expressible designs can be further widened.

A twelfth aspect is a decorative member (10) of any one of the ninth to eleventh aspects. In the twelfth aspect, at least one of the undercoat film (21) or the topcoat film (22) includes a clear layer (201).

With this aspect, the range of expressible designs can be further widened.

A thirteenth aspect is a decorative member (10) based on the twelfth aspect. In the thirteenth aspect, the clear layer (201) includes colored clear coating.

With this aspect, the range of expressible designs can be further widened.

A fourteenth aspect is a decorative member (10) of any one of the ninth to thirteenth aspects. In the fourteenth aspect, the undercoat film (21) includes the aggregate (3). In the low-gloss region (41), the topcoat film (22) has a thickness less than a difference between the average particle size of the aggregate (3) and the thickness of the undercoat film (21). In the high-gloss region (42), the topcoat film (22) has a thickness greater than or equal to the difference between the average particle size of the aggregate (3) and the thickness of the undercoat film (21).

With this aspect, the range of expressible designs can be further widened.

A fifteenth aspect is a method for manufacturing a decorative member (10), the method including a step of preparing a base material (5); a step of forming an undercoat film (21) by applying an undercoat material to the base material (5), the undercoat material including an aggregate (3), the undercoat film (21) having a thickness smaller than an average particle size of the aggregate (3); and a step of forming a topcoat film (22) by applying a topcoat material to the undercoat film (21), the topcoat film (22) having a thickness less than a difference between the average particle size of the aggregate (3) and the thickness of the undercoat film (21) in a part to be formed into a low-gloss region (41), the topcoat film (22) having a thickness greater than or equal to the difference between the average particle size of the aggregate (3) and the thickness of the undercoat film (21) in a part to be formed into a high-gloss region (42).

With this aspect, two regions different from each other in gloss are provided, thereby widening the range of expressible designs.

The invention claimed is:

1. A decorative member comprising:
a construction material including a base material; and
a coating film structure on the construction material,
the base material including
a low-gloss region having a 60° gloss value of smaller than 8 and
a high-gloss region having a 60° gloss value of larger than or equal to 8,
the 60° gloss value of the low-gloss region and the 60° gloss value of the high-gloss region being different from each other by 5 or more,
the base material having a recess and a projection, the coating film structure including the low-gloss region and the high-gloss region,
the coating film structure including
an undercoat film on the base material of the construction material, and
a topcoat film on the undercoat film,
one coating film of the undercoat film or the topcoat film including an aggregate,
the aggregate having an average particle size greater than a thickness of the one coating film, and
the low-gloss region having an uneven surface formed by the aggregate.

2. The decorative member of claim 1, wherein the 60° gloss value of the high-gloss region is larger than or equal to 70 and smaller than or equal to 150.

3. The decorative member of claim 1, wherein the low-gloss region has a surface roughness Ra of greater than or equal to 1.5 µm.

4. The decorative member of claim 1, wherein the high-gloss region has a surface roughness Ra lower than a surface roughness Ra of the low-gloss region.

5. The decorative member of claim 1, wherein the base material has a plurality of the projections, and at least one or more projections of the plurality of projections are each different from a remaining projection in terms of height.

6. The decorative member of claim 1, wherein the projection has a surface provided with a plurality of raised parts extending in one direction.

7. The decorative member of claim 1, wherein the coating film structure further includes a print layer.

8. The decorative member of claim 7, wherein the print layer has a pattern in the low-gloss region and a pattern in the high-gloss region, the pattern in the low-gloss region and the pattern in the high-gloss region being different from each other.

9. The decorative member of claim 1, wherein at least one of the undercoat film or the topcoat film includes a clear layer.

10. The decorative member of claim 9, wherein the clear layer includes colored clear coating.

11. The decorative member of claim 1, wherein the undercoat film includes the aggregate,
in the low-gloss region, the topcoat film has a thickness less than a difference between the average particle size of the aggregate and the thickness of the undercoat film, and in the high-gloss region, the topcoat film has a thickness greater than or equal to the difference between the average particle size of the aggregate and the thickness of the undercoat film.

12. The decorative member of claim 1, wherein
the topcoat film having an inorganic layer and a photocatalyst layer, the inorganic layer being formed on the undercoat film, the photocatalyst layer being formed on the inorganic layer.

* * * * *